United States Patent
Koster

(10) Patent No.: US 8,616,819 B1
(45) Date of Patent: Dec. 31, 2013

(54) LOCK SYSTEM

(76) Inventor: Norman Koster, Richmond Hill (CA)

( * ) Notice: Subject to any disclaimer, the term of this patent is extended or adjusted under 35 U.S.C. 154(b) by 161 days.

(21) Appl. No.: 13/267,416

(22) Filed: Oct. 6, 2011

(51) Int. Cl.
*F16B 21/02* (2006.01)

(52) U.S. Cl.
USPC .......................... 411/551; 411/418; 411/432

(58) Field of Classification Search
USPC .......... 411/432, 418, 349, 549–551, 552, 304
See application file for complete search history.

(56) References Cited

U.S. PATENT DOCUMENTS

| | | | | |
|---|---|---|---|---|
| 298,843 A | * | 5/1884 | Gissinger | 411/304 |
| 1,451,970 A | * | 4/1923 | Taylor | 411/418 |
| 1,801,846 A | | 4/1931 | Campbell | |
| 2,147,080 A | | 2/1939 | Barrett | |
| 2,339,591 A | | 1/1944 | Weber | |
| 2,442,064 A | * | 5/1948 | Veit | 411/349 |
| 2,462,603 A | * | 2/1949 | Boots | 411/304 |
| 4,398,322 A | | 8/1983 | Ewen | |
| 4,755,092 A | | 7/1988 | Yaniv | |
| 5,292,217 A | * | 3/1994 | Korpi | 411/553 |
| D372,857 S | | 8/1996 | Hirai | |
| 5,700,122 A | * | 12/1997 | Korpi | 411/551 |
| 8,382,415 B1 | * | 2/2013 | Goldbaum | 411/551 |

* cited by examiner

Primary Examiner — Flemming Saether

(57) ABSTRACT

A lock system having a bolt wherein a plurality of locking tabs are along a length of the bolt spaced a distance apart, a first track is along a portion of the length of the bolt, an inner nut having an inner channel, wherein threading is on an outer surface of the inner nut and a first mating tab is in the inner channel, the first mating tab slides along the first track as the inner nut slides over the bolt and the first mating tab can slide between a pair of locking tabs on the bolt when the inner nut is rotated in a first or second direction to secure the inner nut in a position along the length of the bolt, and an outer nut having an inner channel with threading and is adapted to removably thread onto the inner nut.

11 Claims, 5 Drawing Sheets

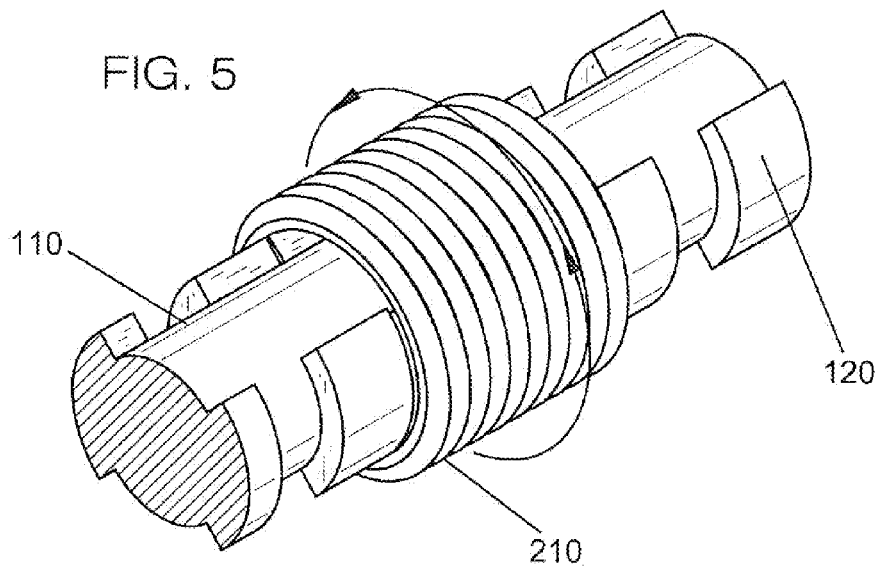
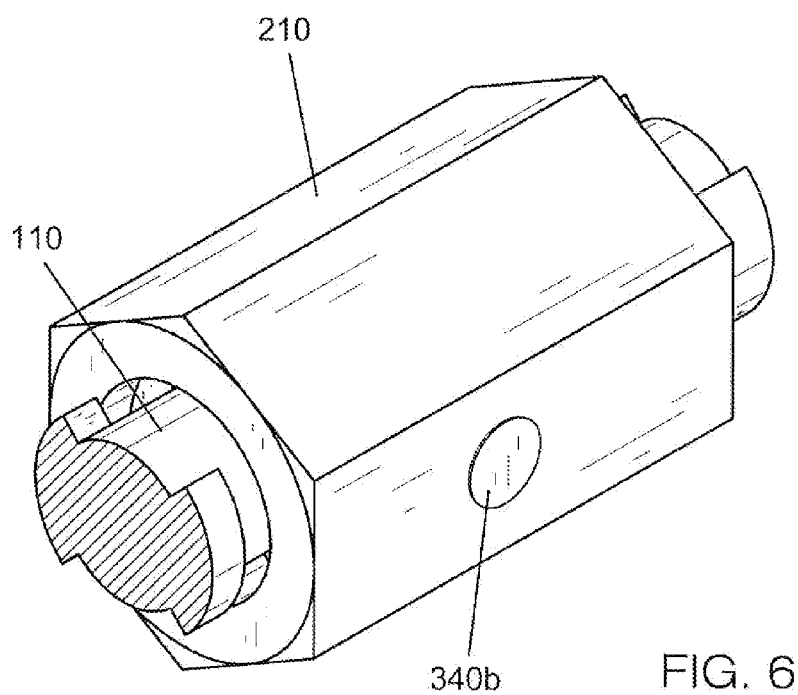

LOCK SYSTEM

FIELD OF THE INVENTION

The present invention is directed to a novel nut and bolt lock system wherein threading is protected inside a nut assembly.

BACKGROUND OF THE INVENTION

Removing a conventional nut from a threaded bolt can be difficult in the presence of rust, paint, and other debris. The present invention features a novel lock system. The system of the present invention is easy to install and remove. The system comprises novel threading that is protected inside a nut assembly to help prevent damage.

SUMMARY

The present invention features a lock system. In some embodiments, the lock system comprises a bolt having a first end and a second end, wherein a plurality of locking tabs is disposed along a length of the bolt spaced a distance apart, a first track is disposed along at least a portion of the length of the bolt from the second end towards the first end; an inner nut having a first end, a second end, and an inner channel, wherein threading is disposed on an outer surface of the inner nut and a first mating tab is disposed in the inner channel, the first mating tab slides along the first track as the inner nut slides over the bolt and the first mating tab can slide between a pair of locking tabs on the bolt when the inner nut is rotated in a first direction or a second direction to secure the inner nut in a position along the length of the bolt; and an outer nut having an inner channel, wherein threading is disposed on the inner channel, the outer nut is adapted to removably thread onto the inner nut.

In some embodiments, a bolt head is disposed on the first end of the bolt. In some embodiments, the locking tabs are evenly spaced along the length of the bolt. In some embodiments, the system further comprises a second track disposed along at least a portion of the length of the bolt from the second end towards the first end, the second track being positioned opposite the first track.

In some embodiments, the system further comprises a second mating tab disposed in the inner channel of the inner nut opposite the first mating tab, the second mating tab slides along the second track as the inner nut slides over the bolt and the second mating tab can slide between a pair of locking tabs on the bolt when the inner nut is rotated in a first direction or a second direction to secure the inner nut in a position along the length of the bolt. In some embodiments, the outer nut has a hexagonal outer cross section.

In some embodiments, a first aperture is disposed in the outer nut extending from its outer surface to the inner channel. In some embodiments, a second aperture is disposed in the outer nut extending from its outer surface to the inner channel, the second aperture being opposite the first aperture. In some embodiments, the system further comprises a first plug adapted to be snugly inserted into the first aperture and extend through to contact the threading on the inner nut. In some embodiments, the system further comprises a second plug adapted to be snugly inserted into the second aperture and extend through to contact the threading on the inner nut.

In some embodiments, second side surfaces of the locking tabs on the bolt are each tapered, the second side surfaces facing the second end of the bolt. In some embodiments, a first side surface of the first mating tab is tapered, the first side surface facing the first end of the inner nut, wherein the first side surface engages a tapered second side surface of a locking tab.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 5 is a perspective view of the system of the present invention. The system is shown without the outer nut for clarity.

FIG. 6 is a perspective view of the system of the present invention.

DESCRIPTION OF PREFERRED EMBODIMENTS

Figure 7:
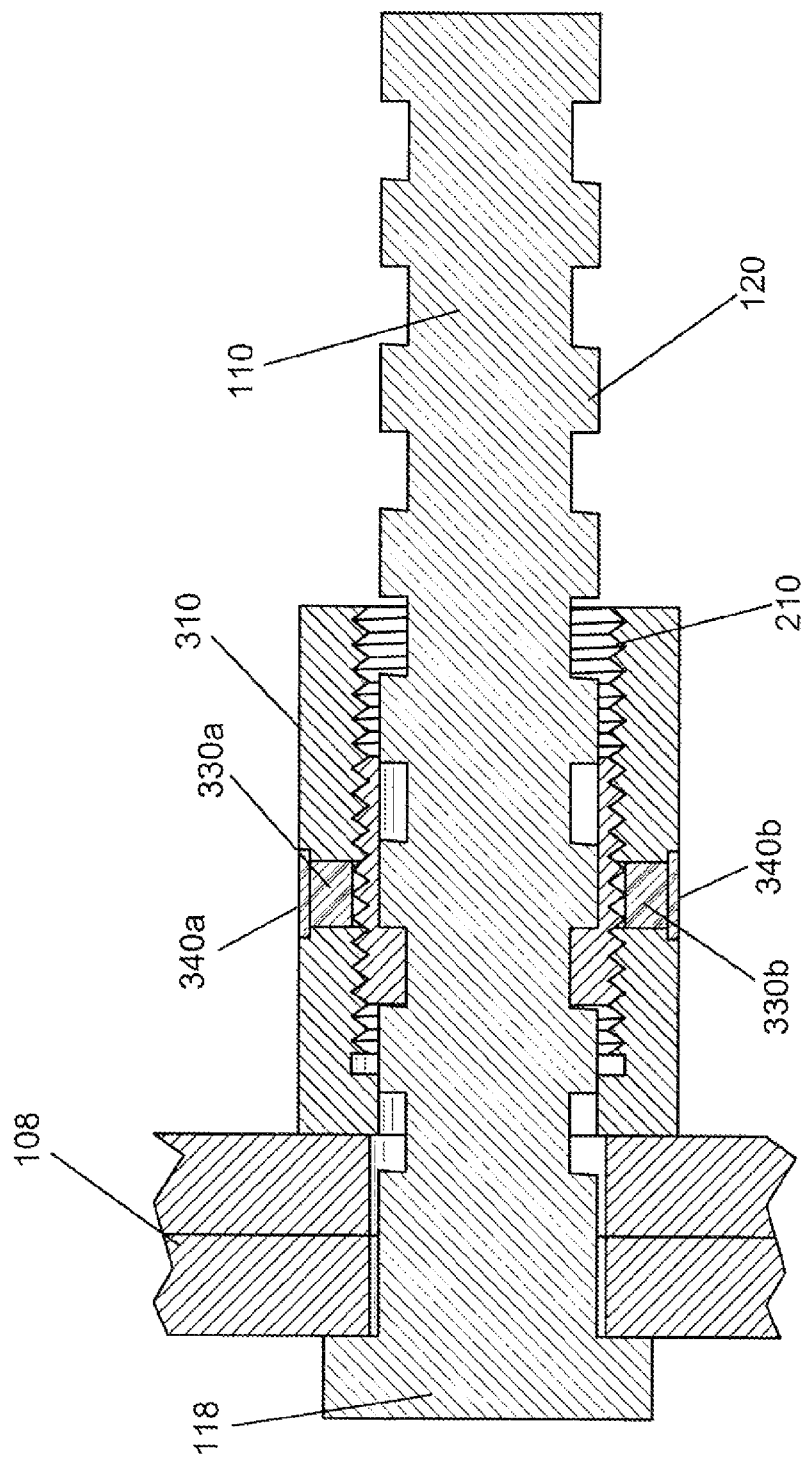
FIG. 7 is a side cross sectional view of the system of the present invention.

Referring now to FIG. 1-7, the present invention features a lock system 100. The system 100 comprises a bolt 110 having a first end 111 and a second end 112. A bolt head 118 is disposed on the first end 111 of the bolt 110. Bolt heads are well known to one of ordinary skill in the art. For example, as shown in FIG. 7, the bolt head 118 has a diameter larger than that of the bolt 110.

Figure 1:
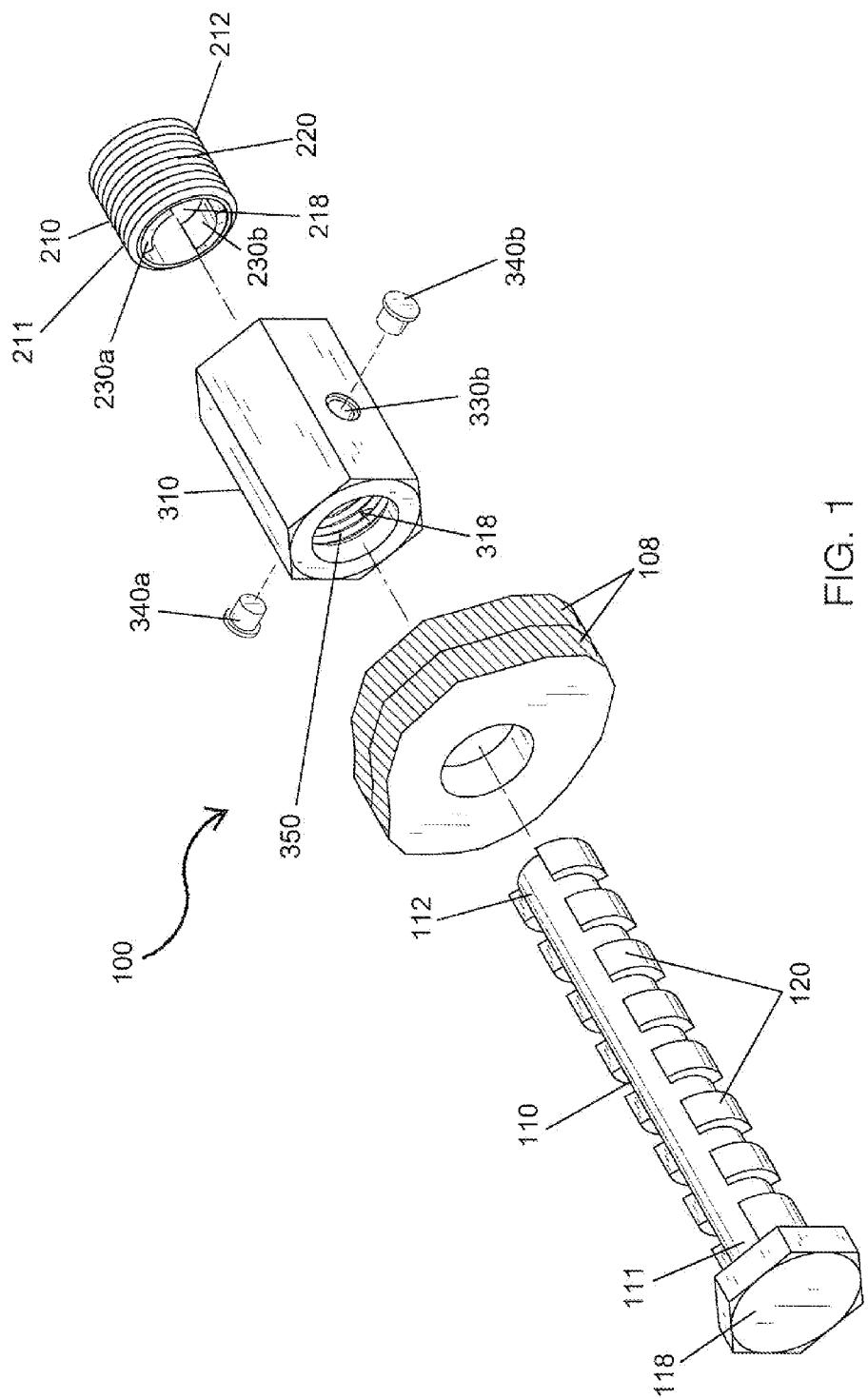
FIG. 1 is an exploded view of the system of the present invention.
Figure 2:
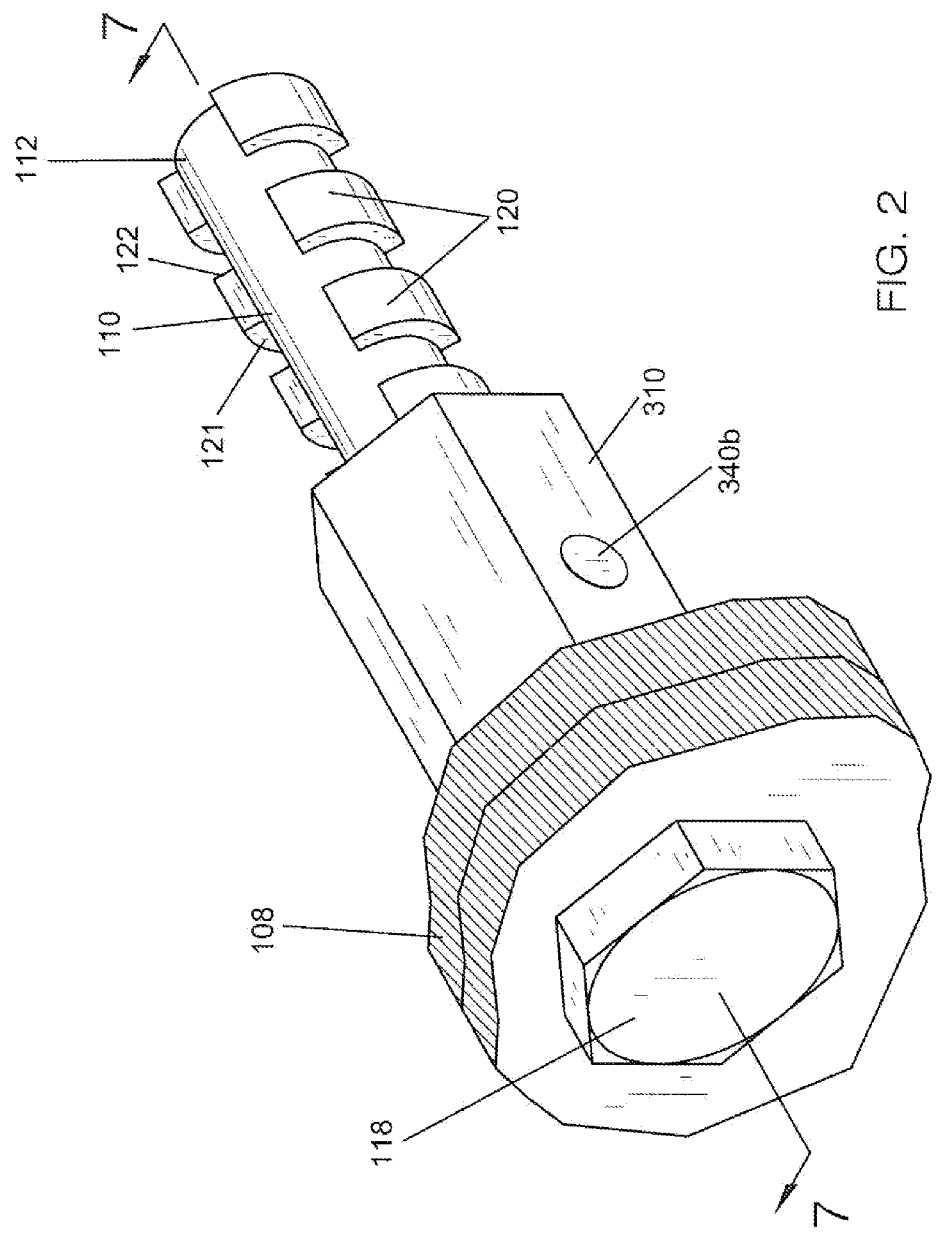
FIG. 2 is a perspective view of the system of the present invention.

A plurality of locking tabs 120 is disposed along the length of the bolt 110 spaced a distance apart, the length of the bolt 110 being measured from the first end 111 to the second end 112. As shown in FIG. 1, the locking tabs 120 are protrusions from the outer surface of the bolt 110. In some embodiments, the locking tabs 120 are evenly spaced along the length of the bolt 110. As shown in FIG. 1 a tab gap is disposed in each locking tab 120 and the tab gaps are aligned (e.g., the locking tabs 120 do not extend along the entire outer circumference of the bolt 110. This creates a first track 130*a* along the length of the bolt 110 (or a portion of the length from the second end 112 upwardly toward the first end 111). In some embodiments, a second track 130*b* is disposed along the length of the bolt 110 (or a portion of the length from the second end 112 upwardly toward the first end 111), wherein the second track 130*b* is opposite the first track 130.

The system 100 further comprises an inner nut 210 having a first end 211 and a second end 212. The inner nut 210 is generally cylindrical and has an inner channel 218 extending from the first end 211 to the second end 212. Threading 220 is disposed on the outer surface of the inner nut 210. A first mating tab 230*a* is disposed on the inner surface of the inner nut 210 in the inner channel 218. The first mating tab 230*a* is adapted to slide through the first track 130 when the inner nut 210 is slid onto the bolt 110. The first mating tab 230*a* is further adapted to slide between a pair of locking tabs 120 on the bolt 110 when the inner nut 210 is rotated in a first direction or a second direction. The mating of the first mating tab 230a and a pair of locking tabs 120 secures the inner nut 210 in a position along the length of the bolt 110.

In some embodiments, the inner nut 210 further comprises a second mating tab 230b disposed on the inner surface of the inner nut 210 in the inner channel 218 opposite the first mating tab 230. The second mating tab 230b is adapted to slide through the second track 130b when the inner nut 210 is slid onto the bolt 110 while the first mating tab 230 slides through the first track 130. Like the first mating tab 230, the second mating tab 230b is further adapted to slide between two locking tabs 120 on the bolt 110 when the inner nut 210 is rotated in a first direction or a second direction.

The system 100 further comprises an outer nut 310 adapted to thread onto the inner nut 210. The outer nut 310 comprises an inner channel 318, wherein threads are disposed along the inner channel 318. The inner channel 318 of the outer nut 310 is adapted to accept the inner nut 210. In some embodiments, the outer nut 310 has a hexagonal outer cross section (as shown in FIG. 1). In some embodiments, the outer nut 310 has a cylindrical outer cross section. In some embodiments, the outer nut 310 has a triangular outer cross section. In some embodiments, the outer nut 310 has a rectangular outer cross section. In some embodiments, the outer nut 310 has a pentagonal outer cross section. In some embodiments, the outer nut 310 has an octagonal outer cross section. The outer nut 310 is not limited to the aforementioned configurations.

Figure 3:
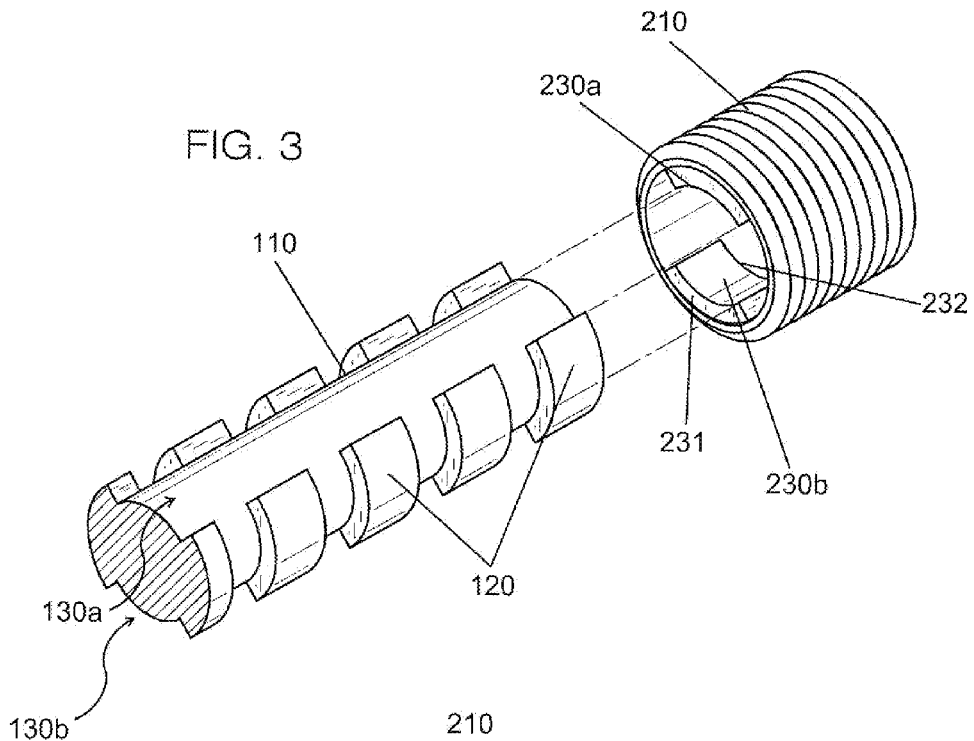
FIG. 3 is an exploded view of the system of the present invention. The system is shown without the outer nut for clarity.
Figure 4:
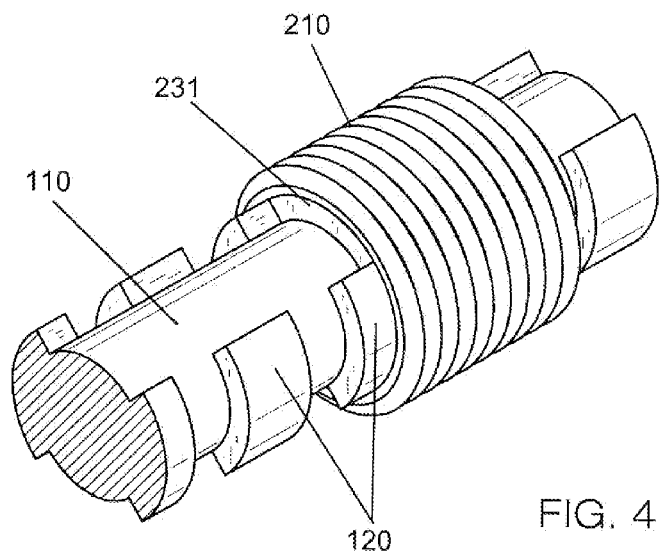
FIG. 4 is a perspective view of the system of the present invention. The system is shown without the outer nut for clarity.

As shown in FIG. 3-5, to attach the inner nut 210 to the bolt 110, the mating tabs 230 of the inner nut 210 are aligned with the tracks 130 of the bolt 110. The mating tabs 230 are slid down the respective tracks 130 in the direction of the bolt head 118 until an appropriate position is achieved for the inner nut 210. The inner nut 210 is then rotated in a first direction or a second direction with respect to the bolt 110 to slide the mating tabs 230 between a pair of locking tabs 120 on the bolt 110 to secure the inner nut 210 on the bolt 110. As shown in FIG. 6, the outer nut 310 can be threaded onto the inner nut 210 to protect the inner nut 210.

In some embodiments, a first aperture 330a is disposed in the outer nut 310 extending from the outer surface to the inner channel 318. In some embodiments, a second aperture 330b is disposed in the outer nut 310 extending from the outer surface to the inner channel 318. In some embodiments, the first aperture 330a and the second aperture 330b are opposite each other. In some embodiments, the system 100 further comprises a first plug 340a adapted to be snugly inserted into the first aperture 330a and extend through to contact the threads on the outer surface of the inner nut 310. In some embodiments, the system 100 further comprises a second plug 340b adapted to be snugly inserted into the second aperture 330b and extend through to contact the threads on the outer surface of the inner nut 310. The plugs 340 can help secure the outer nut 310 on the inner nut 210 (e.g., prevent unwanted rotation of the outer nut 310 with respect to the inner nut 210).

The locking tabs 120 on the bolt 110 each have a first side surface 121 and a second side surface 122. The first side surface 121 faces the first end 111 of the bolt 110, and the second side surface 122 faces the second end 112 of the bolt 110. The mating tabs 230 of the inner nut 210 each have a first side surface 231 and a second side surface 232. The first side surface 231 faces the first end 211 of the inner nut 210, and the second side surface 232 faces the second end 212 of the inner nut 210. In some embodiments, the second side surfaces 122 of the locking tabs 120 are tapered. In some embodiments, the first side surfaces 231 of the mating tabs 230 are tapered, and the tapered surfaces can mate with the tapered surfaces of the locking tabs 120 on the bolt 110.

In some embodiments, a gap is disposed between the bolt head 118 and the topmost locking tab 120 (e.g., the locking tab 120 closest to the first end 111 of the bolt 110). In some embodiments, the gap provides space for the items being bolted (e.g., a pair of plates 108 as shown in FIG. 1 and FIG. 7).

The disclosures of the following U.S. patents are incorporated in their entirety by reference herein: U.S. Pat. No. 1,801,846; U.S. Pat. No. 2,147,080; U.S. Pat. No. 2,339,591; U.S. Pat. No. 4,398,322; U.S. Pat. No. 4,755,092; U.S. Design Pat. No. D372857.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A lock system (100) comprising:
   (a) a bolt (110) having a first end (111) and a second end (112), wherein a plurality of locking tabs (120) is disposed along a length of the bolt (110) spaced a distance apart, a first track (130a) is disposed along at least a portion of the length of the bolt (110) from the second end (112) towards the first end (111); wherein the bolt (110) is free of any through slots;
   (b) an inner nut (210) having a first end (211) a second end (212), and an inner channel (218), wherein threading (220) is disposed on an outer surface of the inner nut (210) and a first mating tab (230) is disposed in the inner channel (218), the first mating tab (230a) slides along the first track (130a) as the inner nut (210) slides over the bolt (110) and the first mating tab (230a) can slide between a pair of locking tabs (120) on the bolt (110) when the inner nut (210) is rotated in a first direction or a second direction to secure the inner nut (210) in a position along the length of the bolt (110); and
   (c) an outer nut (310) having an inner channel (318), wherein threading (350) is disposed on the inner channel (318), the outer nut (310) is adapted to removably thread onto the inner nut (210);
   wherein when the bolt head (110) is in use, the inner nut (210) is completely enclosed inside the outer nut (310).

2. The system (100) of claim 1, wherein a bolt head (118) is disposed on the first end (111) of the bolt (110).

3. The system (100) of claim 1, wherein the locking tabs (120) are evenly spaced along the length of the bolt (110).

4. The system (100) of claim 1 further comprising a second track (130b) disposed along at least a portion of the length of the bolt (110) from the second end (112) towards the first end (111), the second track (130b) being positioned opposite the first track (130a).

5. The system (100) of claim 4 further comprising a second mating tab (230b) disposed in the inner channel (218) of the inner nut (210) opposite the first mating tab (230*a*), the second mating tab (230*b*) slides along the second track (130*b*) as the inner nut (210) slides over the bolt (110) and the second mating tab (230*b*) can slide between a pair of locking tabs (120) on the bolt (110) when the inner nut (210) is rotated in a first direction or a second direction to secure the inner nut (210) in a position along the length of the bolt (110).

6. The system (100) of claim 1, wherein the outer nut (310) has a hexagonal outer cross section.

7. The system (100) of claim 1, wherein a first aperture (330*a*) is disposed in the outer nut (310) extending from its outer surface to the inner channel (318).

8. The system (100) of claim 7, wherein a second aperture (330*b*) is disposed in the outer nut (310) extending from its outer surface to the inner channel (318), the second aperture (330*b*) being opposite the first aperture (330*a*).

9. The system (100) of claim 7 further comprising a first plug (340*a*) adapted to be snugly inserted into the first aperture (330*a*) and extend through to contact the threading on the inner nut (210).

10. The system (100) of claim 8 further comprising a second plug (340*b*) adapted to be snugly inserted into the second aperture (330*b*) and extend through to contact the threading on the inner nut (210).

11. A lock system (100) consisting of:
(a) a bolt (110) having a first end (111) and a second end (112), wherein a plurality of locking tabs (120) is disposed along a length of the bolt (110) spaced a distance apart, a first track (130*a*) is disposed along at least a portion of the length of the bolt (110) from the second end (112) towards the first end (111); wherein the bolt (110) is free of any through slots;
(b) an inner nut (210) having a first end (211), a second end (212), and an inner channel (218), wherein threading (220) is disposed on an outer surface of the inner nut (210) and a first mating tab (230) is disposed in the inner channel (218), the first mating tab (230*a*) slides along the first track (130*a*) as the inner nut (210) slides over the bolt (110) and the first mating tab (230*a*) can slide between a pair of locking tabs (120) on the bolt (110) when the inner nut (210) is rotated in a first direction or a second direction to secure the inner nut (210) in a position along the length of the bolt (110); and
(c) an outer nut (310) having an inner channel (318), wherein threading (350) is disposed on the inner channel (318), the outer nut (310) is adapted to removably thread onto the inner nut (210);
wherein when the bolt head (110) is in use, the inner nut (210) is completely enclosed inside the outer nut (310).

* * * * *